United States Patent [19]

Simpson et al.

[11] Patent Number: 5,327,945
[45] Date of Patent: Jul. 12, 1994

[54] FUEL DISPENSING SPOUT

[75] Inventors: W. Dwain Simpson, Wilton; James H. Pyle, Weston, both of Conn.

[73] Assignee: Saber Equipment Corporation, Stratford, Conn.

[21] Appl. No.: 105,858

[22] Filed: Aug. 11, 1993

[51] Int. Cl.[5] .................................. F16L 9/00
[52] U.S. Cl. ........................ 141/59; 141/290; 141/392; 285/133.1; 138/114; 138/115
[58] Field of Search ............ 141/44, 45, 59, 206, 141/290, 302, 308, 392; 138/109, 111–117; 285/133.1

[56] References Cited

U.S. PATENT DOCUMENTS

| 3,926,230 | 12/1975 | Stary et al. | 141/45 |
| 4,014,369 | 3/1977 | Kobres Jr. | 138/112 |
| 4,199,012 | 4/1980 | Lasater | 141/52 |
| 4,232,715 | 11/1980 | Pyle | 141/1 |
| 4,274,549 | 6/1991 | Germain | 220/746 X |
| 4,351,375 | 9/1982 | Polson | 141/392 X |
| 4,390,383 | 6/1983 | Van Dongeren | 138/109 X |
| 4,505,308 | 3/1985 | Walker et al. | 141/59 |
| 4,570,686 | 2/1986 | Devine | 141/286 |
| 4,906,496 | 3/1990 | Hosono et al. | 138/114 X |
| 5,005,613 | 4/1991 | Stanley | 141/45 |
| 5,035,271 | 7/1991 | Carmack et al. | 141/206 |
| 5,056,569 | 10/1991 | Walker et al. | 141/44 |
| 5,156,191 | 10/1992 | Walker et al. | 138/113 |
| 5,197,523 | 3/1993 | Fink, Jr. et al. | 141/206 |
| 5,213,142 | 5/1993 | Koch et al. | 141/59 |
| 5,244,018 | 9/1993 | Hasselmann | 141/59 |

Primary Examiner—J. Casimer Jacyna
Attorney, Agent, or Firm—Gottlieb, Rackman & Reisman

[57] ABSTRACT

A fuel dispensing spout for use in a fuel dispensing nozzle is provided. The fuel dispensing spout includes an inner cylindrical member and a concentric outer cylindrical member. The inner and outer cylindrical members are joined by a series of ribs which divide the space between the inner and outer members into a plurality of longitudinally and continually extending subchannels. Some of the subchannels are utilized for vapor recovery during operation of the spout, while one of the subchannels is utilized in detecting pressure increases in captured air contained therein as fuel dispensation takes place. The inside passageway defined by the inner cylindrical member is used for carrying fuel that is to be dispensed.

10 Claims, 3 Drawing Sheets

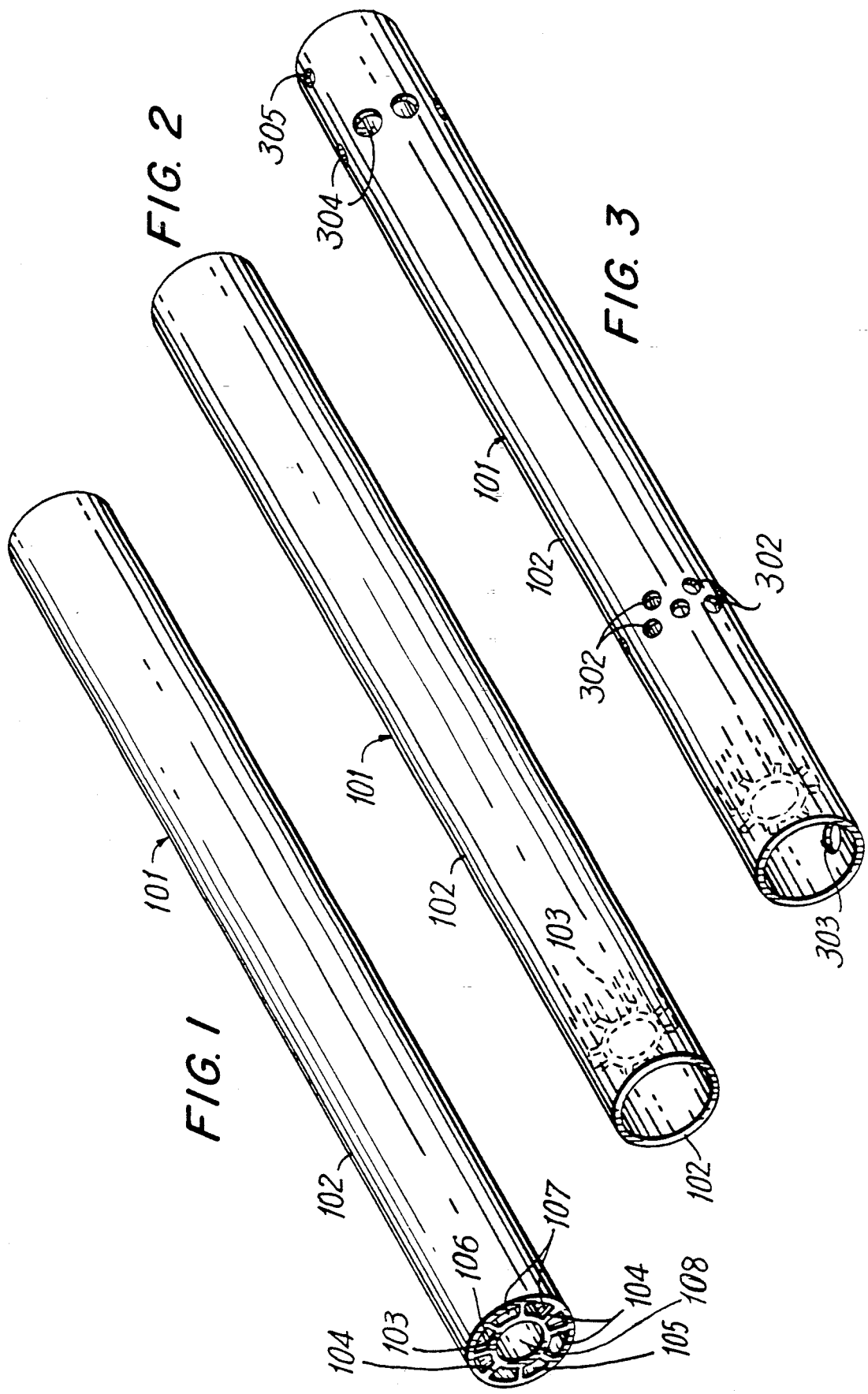

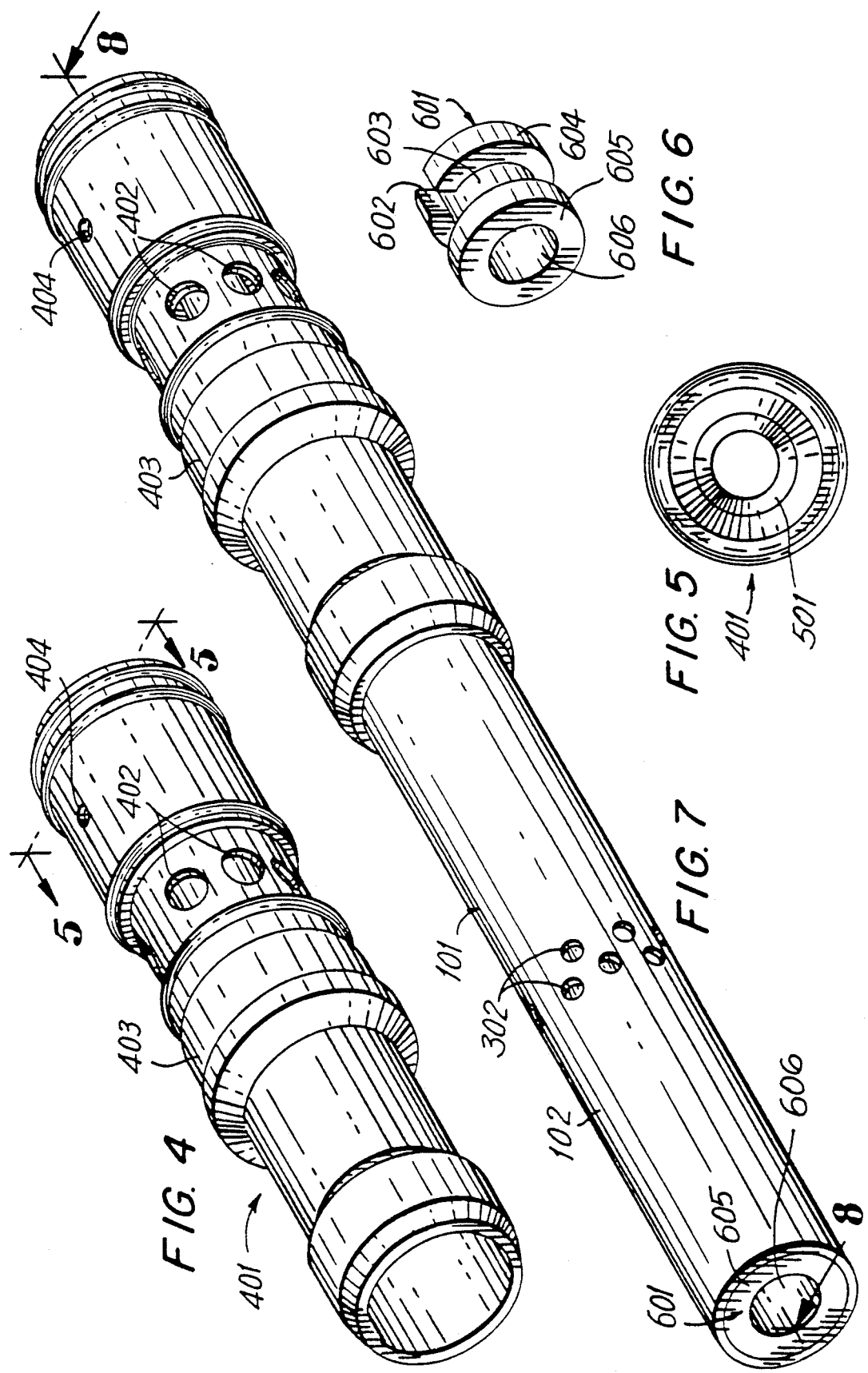

FUEL DISPENSING SPOUT

BACKGROUND OF THE INVENTION

The present invention relates to a fuel dispensing nozzle, and more particularly, to an improved fuel dispensing spout for use in a fuel dispensing and vapor recovery nozzle that is suitable for dispensing fuel, sensing when the fuel tank is full and recovering fuel vapors.

There are numerous different types of spouts for fuel dispensing and vapor recovery nozzles which are utilized throughout the gasoline industry. Typically, a conventional fuel dispensing spout includes a channel or conduit for carrying fuel such as gasoline that is being dispensed. In order to recover fuel vapors and prevent them from escaping into the atmosphere, the nozzle itself typically includes bellows or some other type of channels. Such vapors propagate through the bellows or channels and are returned to the main fuel storage container.

A second channel may be provided in the spout in order to sense increases in the fuel level as the automobile tank fills towards capacity. A shut-off mechanism is activated in order to prevent fuel from being dispensed into the automobile tank. When the fuel level rises above the input port of the channel in the spout, a pressure differential is created across a diaphragm, causing a trigger mechanism to de-couple.

While most prior art spouts have proven somewhat satisfactory, they have disadvantages in that they are difficult and cumbersome to manufacture. Typically, the spouts are manufactured in separate pieces and require complex manipulations in order to fit the pieces together, seal the pieces correctly in order to avoid leaks, and assure proper sizing. Because of these drawbacks, the cost of manufacturing is increased and the reliability of the spout and nozzle in use is less than desired.

Accordingly, it would be desirable to provide a fuel dispensing spout construction which overcomes the above disadvantages and which may be manufactured from a single extrusion of metal or other material.

SUMMARY OF THE INVENTION

Generally speaking, in accordance with the invention, a fuel dispensing spout for use in a fuel dispensing nozzle is provided. The fuel dispensing spout includes an inner cylindrical member and a concentric outer cylindrical member. The inner and outer cylindrical members are joined by a series of ribs which divide the space between the inner and outer members into a plurality of longitudinally and continually extending subchannels. Some of the subchannels are utilized for vapor recovery during operation of the spout, while one or more of the remaining subchannels are utilized in detecting increases in the vapor pressure of air captured therein as fuel dispensation takes place. The inside passageway defined by the inner cylindrical member is used for carrying fuel that is to be dispensed.

Significantly, the fuel dispensing spout of the invention may be manufactured from a single tubular pipe made of metal or some other hard material. As a result, there is no need for complicated connections and seals in the spout, as is found in the prior art.

Accordingly, an object of the invention is to provide an improved fuel dispensing spout which can be extruded as a single piece, eliminating internal seals.

Another object of the invention is to provide an improved fuel dispensing spout which is suitable for detecting increases in vapor pressure as fuel dispensation into a fuel tank of an automobile takes place.

A further object of the invention is to provide an improved fuel dispensing spout which is suitable for recovering fuel vapor during fuel dispensation.

Still other objects and advantages of the invention will be apparent from the following description.

The invention accordingly comprises the device or apparatus possessing the features, properties and relation of components which will be exemplified in the product hereinafter described, and the scope of the invention will be indicated in the claims.

BRIEF DESCRIPTION OF THE DRAWINGS

For a fuller understanding of the invention, reference is made to the following detailed description, taken in connection with the accompanying drawings, in which:

FIG. 1 is a perspective view in elevation showing an aspect of the fuel dispensing spout of the invention;

FIG. 2 is a perspective view in elevation showing the fuel dispensing spout of the invention in which the forward portions of the inner cylindrical member and longitudinally extending ribs have been cut away;

FIG. 3 is a perspective view in elevation of the fuel dispensing spout shown in FIG. 2 having a series of bores formed in the outer cylindrical member;

FIG. 4 is a perspective view in elevation of a rear end cap;

FIG. 5 is a perspective view in elevation of the rear of the rear end cap shown in FIG. 4;

FIG. 6 is a perspective view in elevation of the front end cap that is used with the fuel dispensing spout of the invention;

FIG. 7 shows a perspective view of the complete assembly of the invention;

DETAILED DESCRIPTION OF THE DRAWINGS

Figure 8:
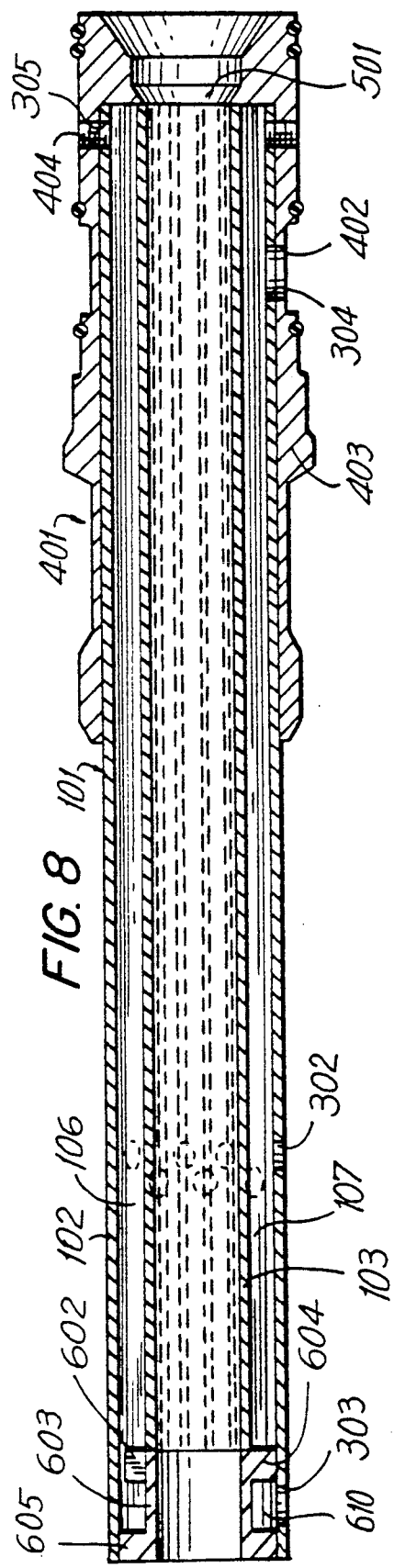
FIG. 8 is a cross-sectional view taken along line 8—8 FIG. 7.

Referring first to FIG. 1, the improved fuel dispensing spout of the invention, generally indicated at 101, is described. Fuel dispensing spout 101 is extruded as a single piece and comprises an outer cylindrical member 102 and an inner concentrically disposed cylindrical member 103. Outer cylindrical member 102 and inner cylindrical member 103 are connected together by a series of longitudinally and continually extending ribs 104 which define a plurality of continually extending channels 105. Plurality of ribs 104 maintain the structural integrity of spout 101 and provide appropriate support for members 102 and 103. This is especially advantageous if spout 101 is made of a lightweight metal such as aluminum.

Channels 105 comprise a first channel 106, chosen at random during manufacture. When in service, spout 101 is oriented such that channel 106, which is used in sensing increases in the pressure of air captured therein during fuel tank refilling, as described in more detail below, is at the top. Channels 105 further comprise remaining channels 107 for recovering fuel vapors during fuel dispensation, also as described in more detail hereinbelow. Inner cylindrical member 103 defines an inner longitudinal passageway 108 which is suitable for fuel flow as it is being dispensed through spout 101.

Turning now to FIGS. 2 and 3, the construction and design of spout 101 is further described. During manufacture, the forward or front portions of inner cylindrical member 103 and ribs 104 are cut away at a predetermined distance from the end of spout 101, as shown in FIG. 2. This is achieved by one of a number of conventional processes such as end turning. This step is carried out in order to provide a receptacle for a suitable front end cap, as discussed below.

Fuel dispensing spout 101 further includes a series of radially formed bores 302, as best shown in FIG. 3. Each of bores 302 is substantially radially spaced apart from adjacent bores 302. Bores 302 are formed in cylindrical member 102 at a location rearwardly of the forward end of inner cylindrical member 103 (see FIG. 8) and communicate with channels 107. Each of bores 302 is used in connection with recovering fuel vapors during fuel dispensation, as described below.

As shown in FIG. 3, outer cylindrical member 102 includes an additional bore 303 formed therein. Said bore is located diametrically opposite channel 106 and forward of inner cylindrical member 103. Bore 303 is used in sensing an increase in the fuel level during fluid dispensation into a fuel tank, as described below.

Continuing with FIG. 3, outer cylindrical member 102 includes a series of additional radially formed bores 304 at a location substantially rearwardly of bores 303 and which communicate with channels 107. Each of bores 304 is used in connection with recovering fuel vapors during fuel dispensation, as described below.

FIG. 3 also reveals a further bore 305 formed in outer cylindrical member 102 and located rearwardly of bores 304. Bore 305 communicates with channel 106 and is used in sensing an increase in the fuel level during fluid dispensation into a fuel tank, as described below.

Turning now to FIGS. 4 and 5, the construction and design of the inventive spout is further described. FIGS. 4 and 5 show rear cap 401, which is made from a hard material such as metal by one of a number of conventional processes such as turning on a lathe. FIG. 4 also reveals annular bores 402 formed in cap 401 and located rearwardly of annular portion 403. Significantly, when cap 401 is properly placed over the rearward portion of outer cylindrical member 102 of spout 101 (see FIGS. 7 and 8), bores 402 are in alignment with bores 304 of member 102 and thus communicate with channels 107.

FIG. 4 also reveals bore 404 formed in cap 401 and located rearwardly of annular portion 403. Significantly, when cap 401 is properly placed over the rearward portion of outer cylindrical member 102 (see FIGS. 7 and 8), bore 404 is in alignment with bore 305 and thus communicates with channel 106, this provides a pathway for captured air in channel 106 to exit and be evaluated for increases in pressure, as described below.

FIG. 5 shows the rearward end of cap 401. Significantly, when cap 401 is properly placed over the rearward portion of outer cylindrical member 102, the forward face of annular ring 501 formed therein abuts the rearward ends of ribs 104 and cylinders 102 and 103. Consequently, and with the use of chemical sealants well known in the art, channels 105 are terminated.

Referring now to FIG. 6, front end cap 601 is shown and is used for redirecting the pressure pathway from the bottom to the top of spout 101. Cap 601 comprises a forward annular portion 605, a middle annular portion 603 and a rear annular portion 604. Each of annular portions 605, 603 and 604 are substantially donut-shaped, thereby creating a pathway 606 therethrough. Forward annular portion 605 and rear annular portion 604 have substantially the same diameter and each are adapted to fit snugly within the front end of outer cylindrical member 102, as shown in FIGS. 7 and 8. Moreover, front end cap 601 has a width which is substantially equal to the length of that portion of inner cylindrical member 103 which was cut away, as discussed hereinabove. As a result, front end cap 601 will fit properly into outer cylindrical member 102, as shown in FIG. 4, and the forward end thereof will coincide with the front end of cylindrical member 102.

Continuing with FIGS. 6, 7 and 8, middle portion 603 of front end cap 601 has a diameter which is somewhat smaller than the diameter of forward and rear portions 605 and 604. Therefore, when front end cap 601 is inserted into outer cylindrical member 102, as shown in FIGS. 7 and 8, an annular chamber 610 is formed between middle section 603 of front end cap 601 and the inner surface of outer cylindrical member 102. Significantly, chamber 610, when front end cap 601 is properly placed within the forward portion of outer cylindrical member 102, is in alignment with forward bore 303.

Rear portion 604 of front-end cap 601 is formed with a partial cut-out 602 (see FIG. 6) located substantially along the top thereof. As shown in FIGS. 7 and 8, when front end cap 601 is properly placed within the front portion of outer cylindrical member 102, cut-out 602 defines a space which communicates with annular chamber 610 formed between middle portion 603 and cylindrical member 102, on the one hand, and longitudinally extending channel 106 on the other hand.

Figure 10:
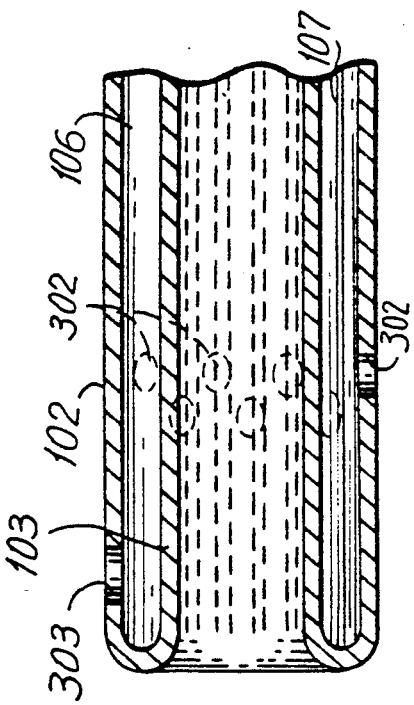
FIG. 10 is a cross-sectional view taken along line 10—10 of FIG. 9.
Figure 9:
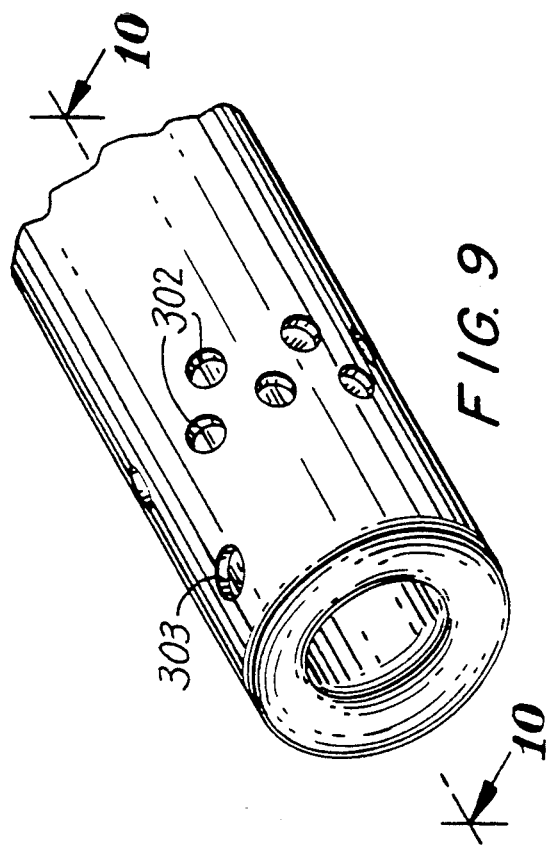
FIG. 9 is a perspective view in elevation showing "coining" of the front of the spout.

Alternatively, instead of utilizing front-end cap 601, the forward end of spout 101 may be "coined" in order to close it. Coining is achieved, as shown in FIGS. 9 and 10, by cutting away ribs 104 to a predetermined depth and forcing the end against a die while rotating either the dye or spout 101. Therefore, channel 106 runs along the bottom of spout 101 instead of the top—there is no front end cap for redirecting the pressure pathway to the top of the spout. A bore at the rear of channel 106 and communicating with an annular or helical groove formed around cap 401 may be provided. The groove carries pressure signal to the top of cap 401 where it would be accessible to suitable measuring equipment.

Referring now to FIG. 7, as well as to FIG. 8, operation of fluid dispensing spout 101 will be described. In the first place, passageway 108, extending longitudinally within inner cylindrical member 103, and which runs from the rear of spout 101 to the front thereof, is used for carrying fuel. The fuel flows within passageway 108, through pathway 606 of front end cap 601, and exits the forward end of spout 101.

A second pathway is provided for carrying captured air or vapor in order to sense increases in pressure as the automobile fuel tank is being refilled. Specifically, when the fuel level in an automobile fuel tank reaches a certain level, the fuel will enter forward bore 303 and begin to invade annular chamber 610 located between middle portion 603 of front end cap 601 and outer cylindrical member 102. This fuel will then be carried through the space defined by cut-out 602 formed in rear portion 604 of front end cap 601, where it will pass to longitudinally extending channel 106—in turn, captured air or vapor in channel 106 is compressed, increasing the pressure thereof. Bore 404, which communicates through bore 305 with channel 106, is connected to a pressure sensing device of the type well known in the art. When the sensed pressure of the captured air reaches a certain level, the pressure sensing device triggers the shut-off of fuel being dispensed through fuel dispensing spout 101.

Fuel vapors which are to be recovered during fuel dispensation enter radially formed bores 302 of outer cylinder member 102 and pass to longitudinally extending channels 107. Significantly, the collected fuel vapors can not propagate in a forward direction once inside channels 107 because rear portion 604 of front end cap 601 acts as a stop. Therefore, the collected vapors propagate rearwardly through channels 107 until reaching the region of bores 304 and 402, which allow the vapors to escape out of spout 101 and cap 401. At this location, a vapor recovery mechanism as is well known in the art is placed over bores 402 in cap 401 in order to return the vapors to the fuel dispensing tank or container.

It will thus be seen that the objects set forth above, among those made apparent from the preceding description, are efficiently attained, and since certain changes may be made in the above construction without departing from the spirit and scope of the invention, it is intended that all matter contained in the above description or as shown in the drawings shall be interpreted as illustrative and not in a limiting sense.

It is also to be understood that the following claims are intended to cover all of the generic and specific features of the invention described herein and all statements of the scope of the invention which, as a matter of language, might be said to fall therebetween.

What is claimed:

1. An integrally extruded fuel dispensing spout assembly having a forward end and a rearward end comprising:
    a longitudinally extending inner member defining a passageway for carrying fuel from said rearward end to said forward end;
    a longitudinally extending outer member disposed about said inner member and defining a space therebetween;
    a plurality of longitudinally extending ribs defining a plurality of channels in said space;
    said plurality of channels including at least one continuous longitudinal channel being used in detecting when fuel dispensation has reached a desired level, and at least a second continuous longitudinal channel being adapted for recovering fuel vapor at said forward end and carrying said recovered fuel vapor to a fuel storage compartment;
    said outer member including at least one opening formed therein proximate said forward end and in communication with said at least one channel;
    said outer member including at least a second opening formed therein proximate said forward and rearward of said at least one opening and in communication with said at least a second channel; and
    said at least a second opening not being in communication with said at least one channel and said at least one opening not being in communication with said at least a second channel.

2. The assembly of claim 1, wherein said outer member includes at least one other opening formed therein along said rearward end and in communication with said at least one channel.

3. The assembly of claim 1, wherein said outer member includes a further opening formed therein at said rearward end through which fuel vapor exits from said at least a second channel.

4. The assembly of claim 3, wherein said at least a second channel comprises a plurality of channels.

5. The assembly of claim 1, wherein each of said outer and inner members has a forward end and a rearward end, said forward end of said outer member extending beyond the forward end of said inner member.

6. The assembly of claim 5, further including a front end cap located inside the outer member at its forward end and substantially abutting the forward end of the inner member.

7. The assembly of claim 6, wherein said end cap and said outer member define a chamber therebetween which allows fuel vapor to flow from said at least one opening to said at least one channel.

8. The assembly of claim 6, wherein said at least a second opening is located rearwardly of said front end cap.

9. The assembly of claim 6, wherein said outer member includes a further opening formed therein at said rearward end through which fuel vapor exits from said at least a second channel.

10. The assembly of claim 1, further including a rear end cap located over the outer member of its rearward end.

* * * * *